(12) United States Patent
Groves, II et al.

(10) Patent No.: US 11,591,966 B2
(45) Date of Patent: Feb. 28, 2023

(54) MODULATED TURBINE COMPONENT COOLING

(71) Applicant: General Electric Company, Schenectady, NY (US)

(72) Inventors: Robert Charles Groves, II, West Chester, OH (US); Kirk Douglas Gallier, Liberty Township, OH (US); Charles William Craig, III, West Chester, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/060,162

(22) Filed: Oct. 1, 2020

(65) Prior Publication Data

US 2021/0017907 A1 Jan. 21, 2021

Related U.S. Application Data

(63) Continuation of application No. 15/231,846, filed on Aug. 9, 2016, now Pat. No. 10,794,289.

(51) Int. Cl.
*F02C 7/18* (2006.01)
*F02C 3/04* (2006.01)
(Continued)

(52) U.S. Cl.
CPC ............... *F02C 7/18* (2013.01); *F01D 5/186* (2013.01); *F01D 5/189* (2013.01); *F01D 9/065* (2013.01);
(Continued)

(58) Field of Classification Search
CPC ...... F02C 7/18; F02C 3/04; F02C 3/10; F01D 5/186; F01D 5/187; F01D 5/188; F01D 5/189; F01D 9/065; F01D 11/24; F01D 25/12; F05D 2240/11; F05D 2260/201; F05D 2260/202; F05D 2300/505; F05D 2300/6033; Y02T 50/60
See application file for complete search history.

(56) References Cited

U.S. PATENT DOCUMENTS 3,966,354 A * 6/1976 Patterson ................ F01D 11/18
415/116
3,975,901 A * 8/1976 Hallinger ................ F01D 11/24
415/117
(Continued)

*Primary Examiner* — Loren C Edwards
(74) *Attorney, Agent, or Firm* — Dority & Manning, P.A.

(57) ABSTRACT

Features and methods for modulating a flow of cooling fluid to gas turbine engine components are provided. In one embodiment, an airfoil is provided having a flow modulation insert for modulating a flow of cooling fluid received in a cavity of a body of the airfoil. In another embodiment, a shroud is provided comprising a cooling channel for a flow of cooling fluid and an insert that varies in position to modulate the flow of cooling fluid through the cooling channel. In yet another embodiment, a method for operating a gas turbine engine having a cooling circuit for cooling one or more components of the gas turbine engine comprises increasing power provided to the engine and decreasing power provided to the engine to modulate a position of a flow modulation insert located in the cooling circuit and thereby modulate the flow of cooling fluid through the cooling circuit.

8 Claims, 11 Drawing Sheets

(51) Int. Cl.
    *F02C 3/10*    (2006.01)
    *F01D 11/24*   (2006.01)
    *F01D 9/06*    (2006.01)
    *F01D 5/18*    (2006.01)

(52) U.S. Cl.
    CPC ............ *F01D 11/24* (2013.01); *F02C 3/04* (2013.01); *F02C 3/10* (2013.01); *F05D 2240/11* (2013.01); *F05D 2260/201* (2013.01); *F05D 2260/202* (2013.01); *F05D 2300/505* (2013.01); *F05D 2300/6033* (2013.01); *Y02T 50/60* (2013.01)

(56) References Cited

U.S. PATENT DOCUMENTS

| | | | |
|---|---|---|---|
| 4,526,512 A | | 7/1985 | Hook |
| 4,859,141 A | | 8/1989 | Maisch et al. |
| 5,064,343 A | * | 11/1991 | Mills ............ F01D 11/16 415/12 |
| 7,854,391 B2 | | 12/2010 | Jiang et al. |
| 2010/0239414 A1 | * | 9/2010 | Tesh ............ F01D 11/001 415/173.7 |
| 2010/0288376 A1 | * | 11/2010 | Haasz ............ F02C 7/18 137/468 |
| 2013/0174534 A1 | | 7/2013 | Pushkaran et al. |
| 2013/0312425 A1 | | 11/2013 | Thornton et al. |
| 2014/0271101 A1 | | 9/2014 | Slavens et al. |

* cited by examiner

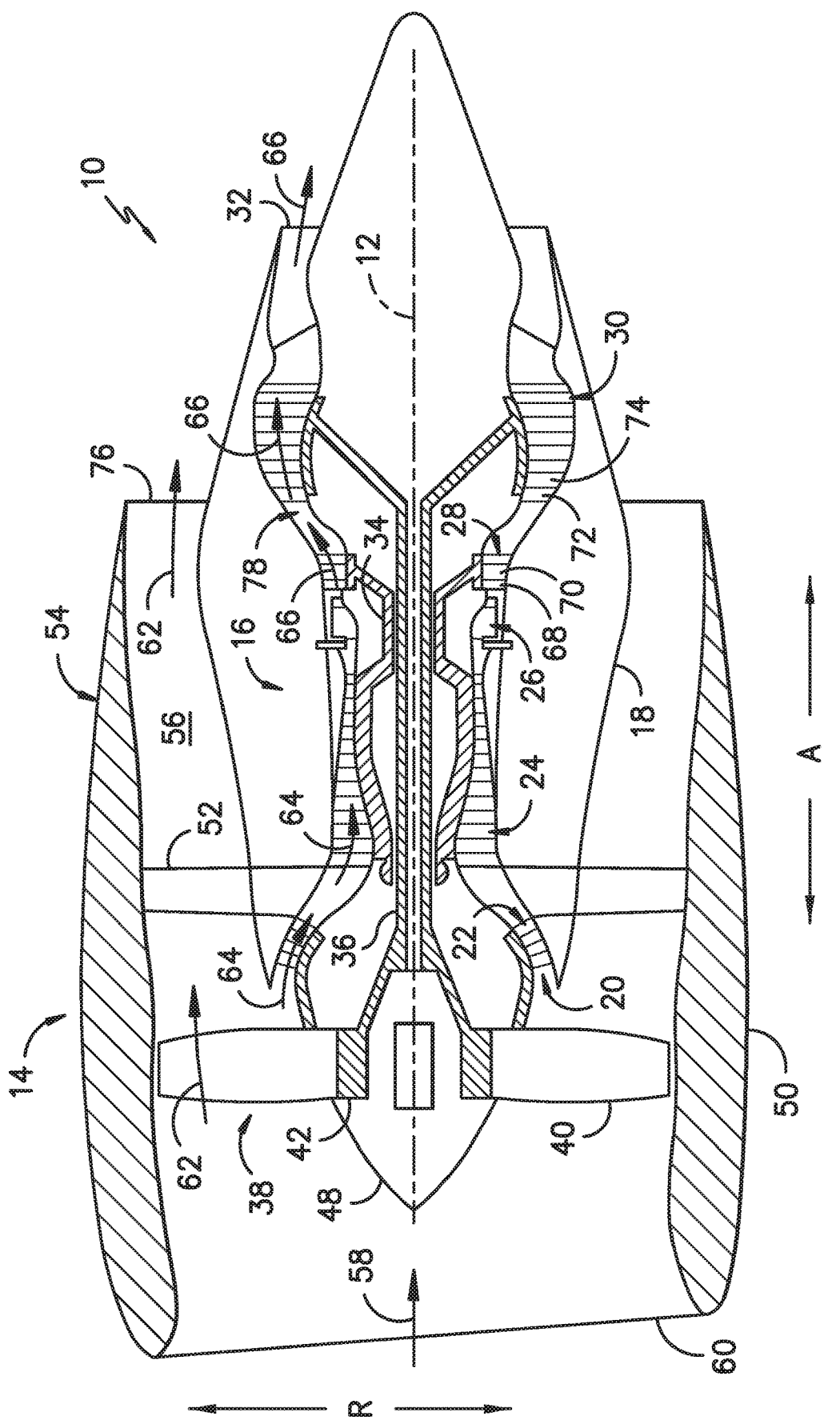
FIG. -1-

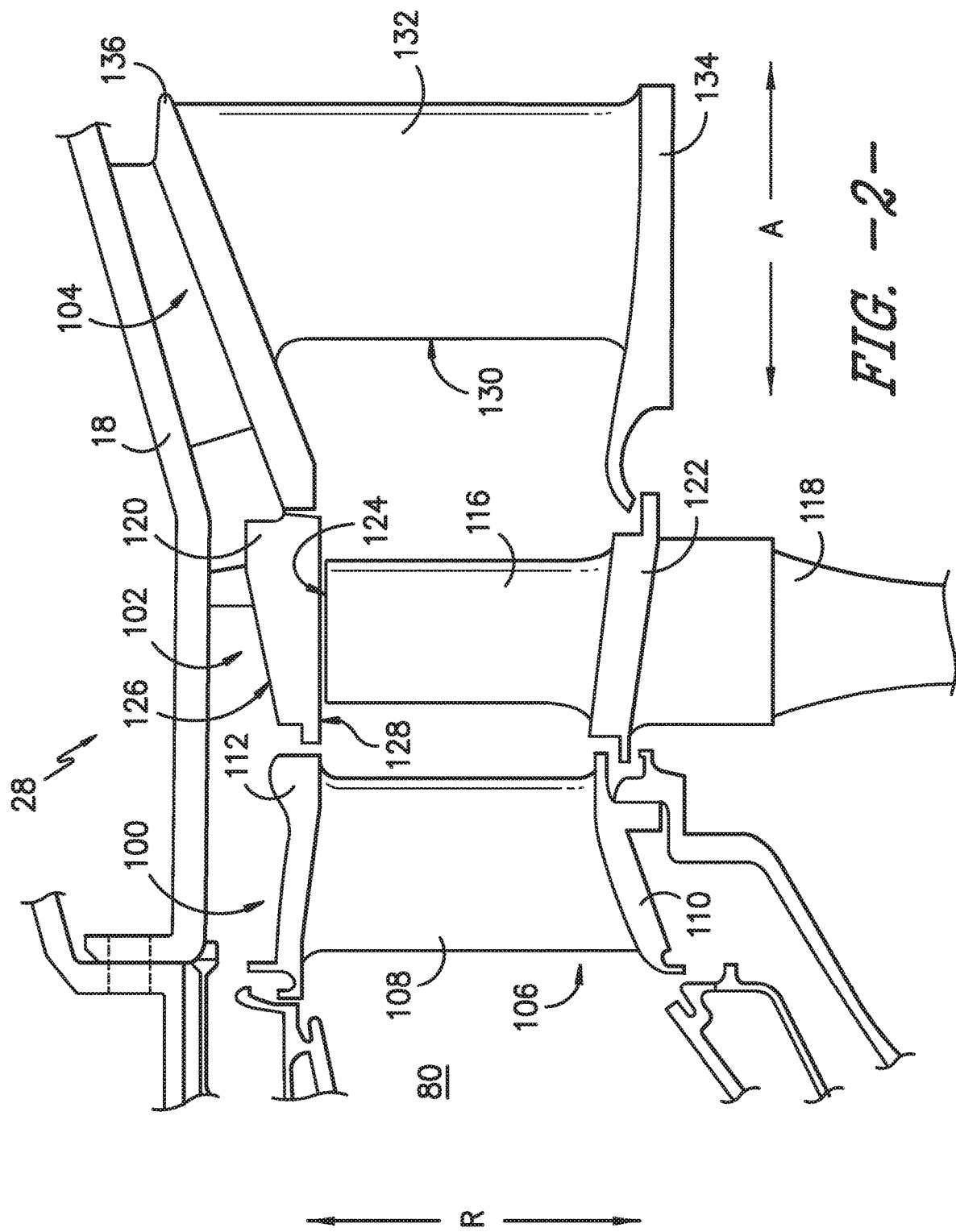
FIG. -2-

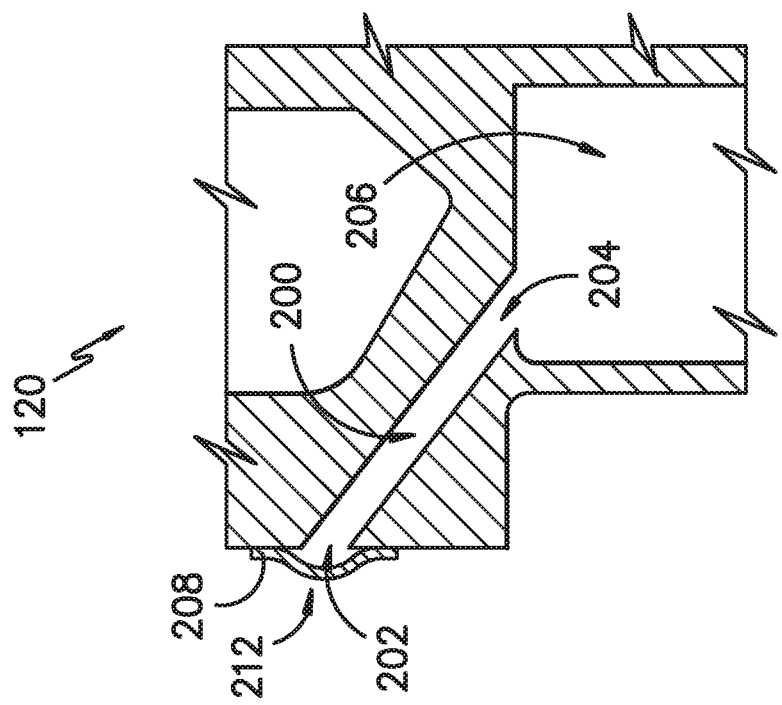
FIG. -3B-
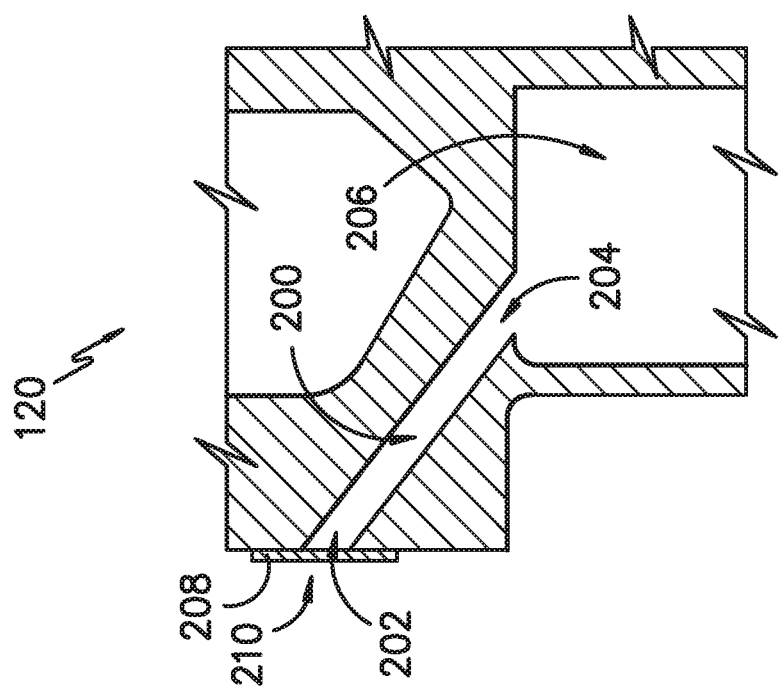
FIG. -3A-

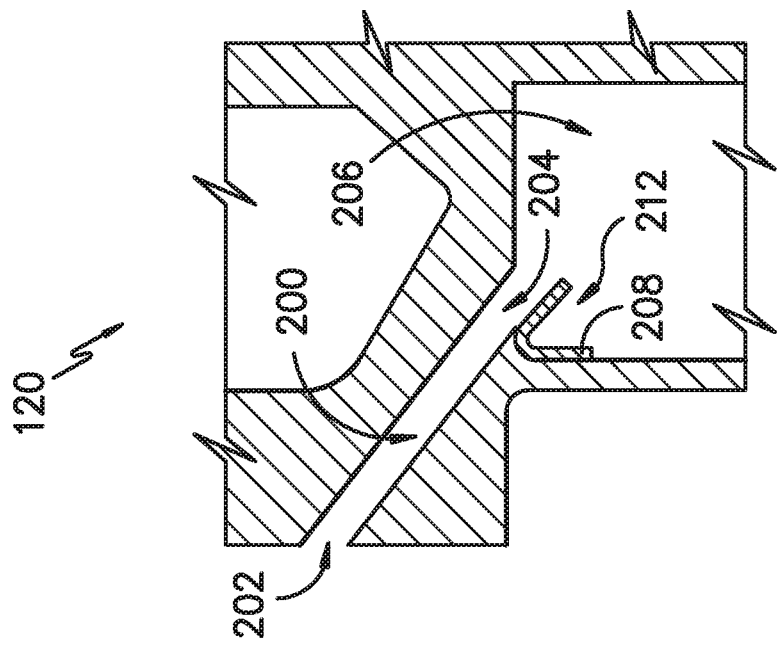
FIG. -3D-
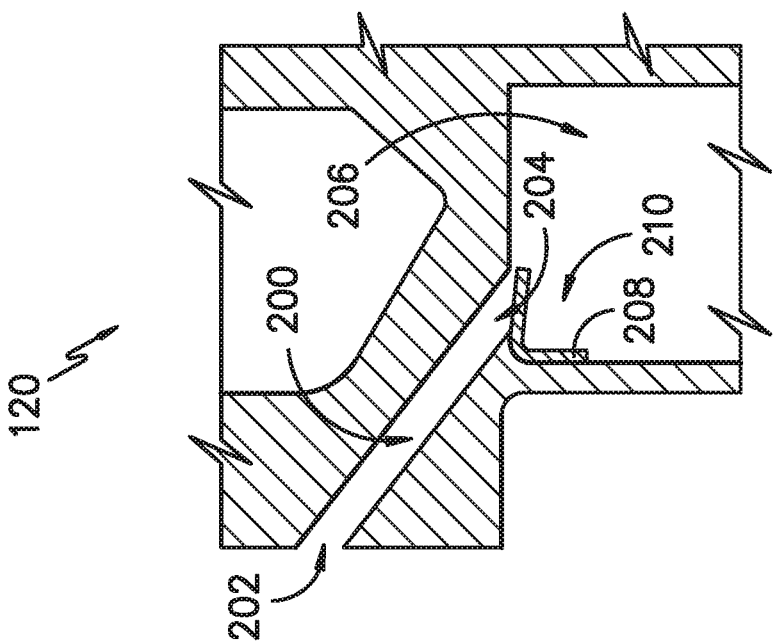
FIG. -3C-

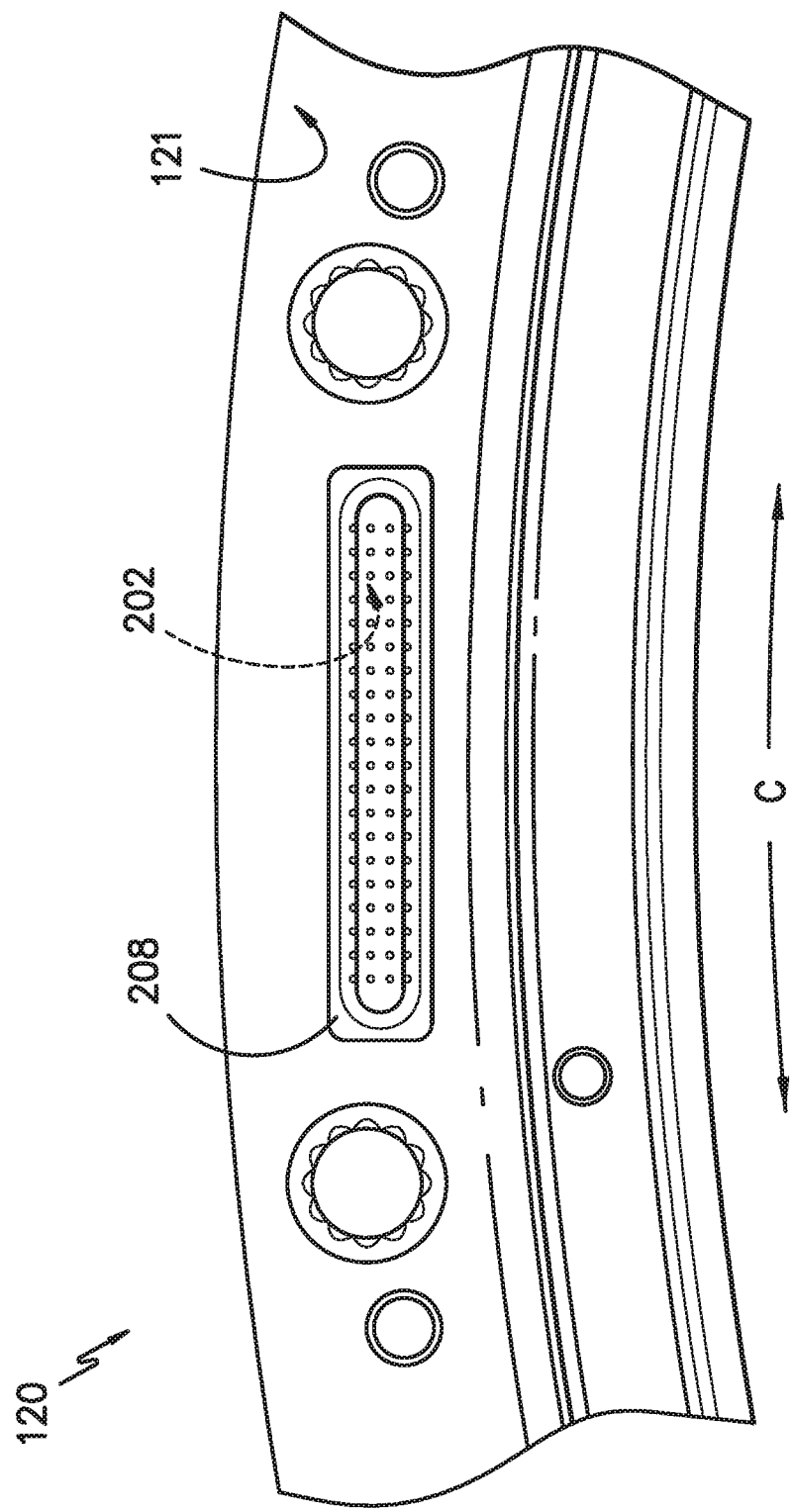

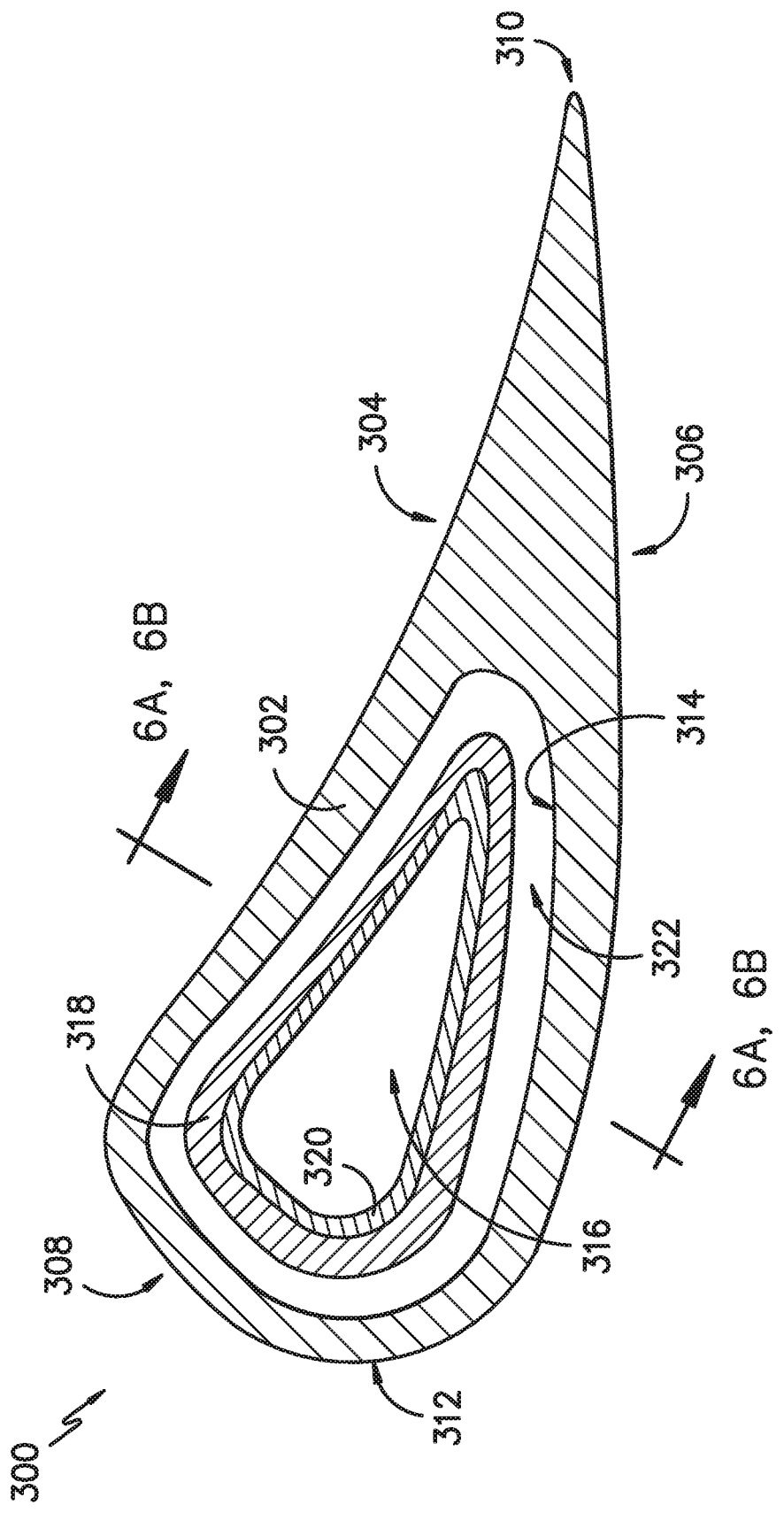
FIG. -5-

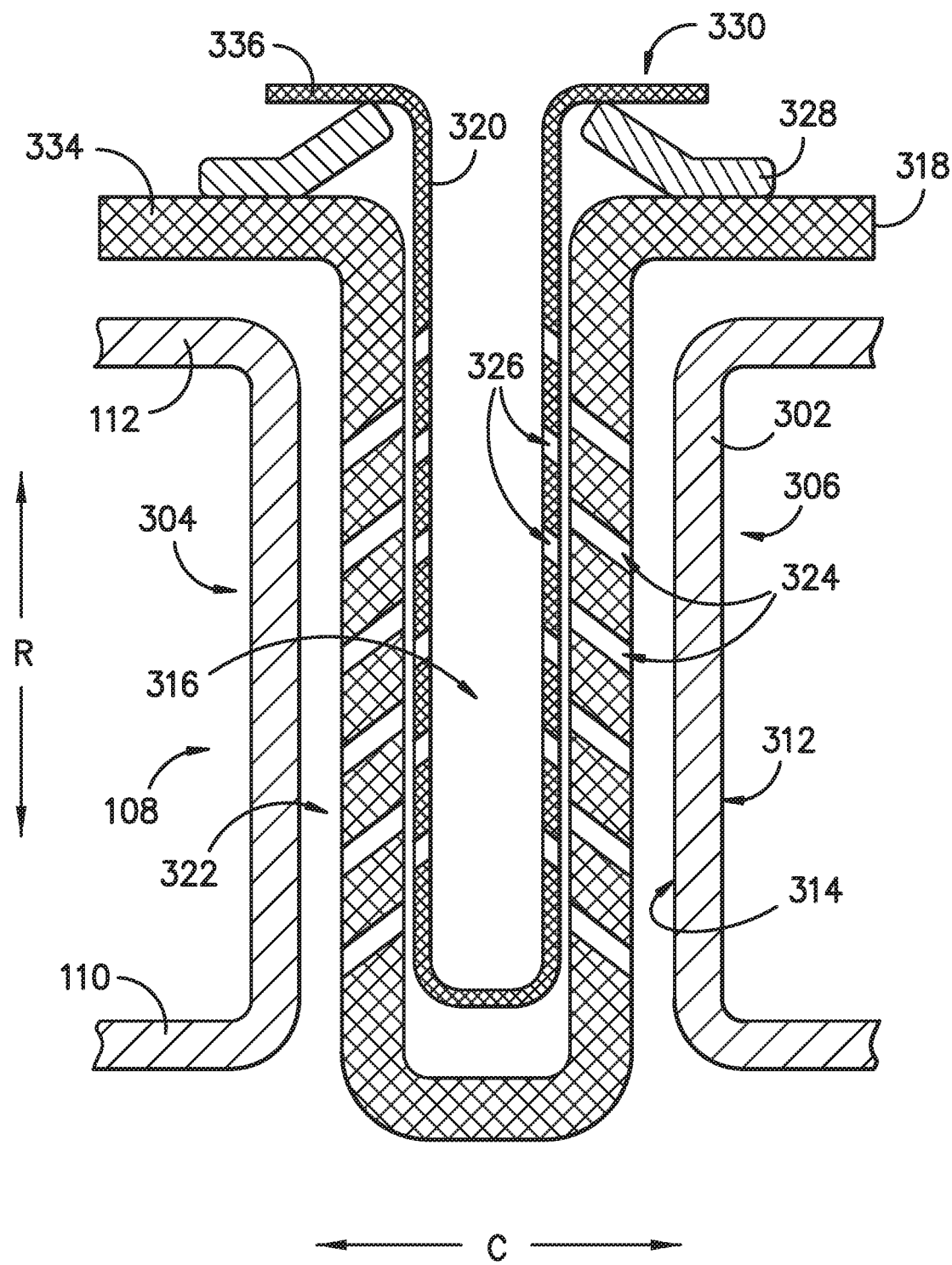
FIG. -6A-

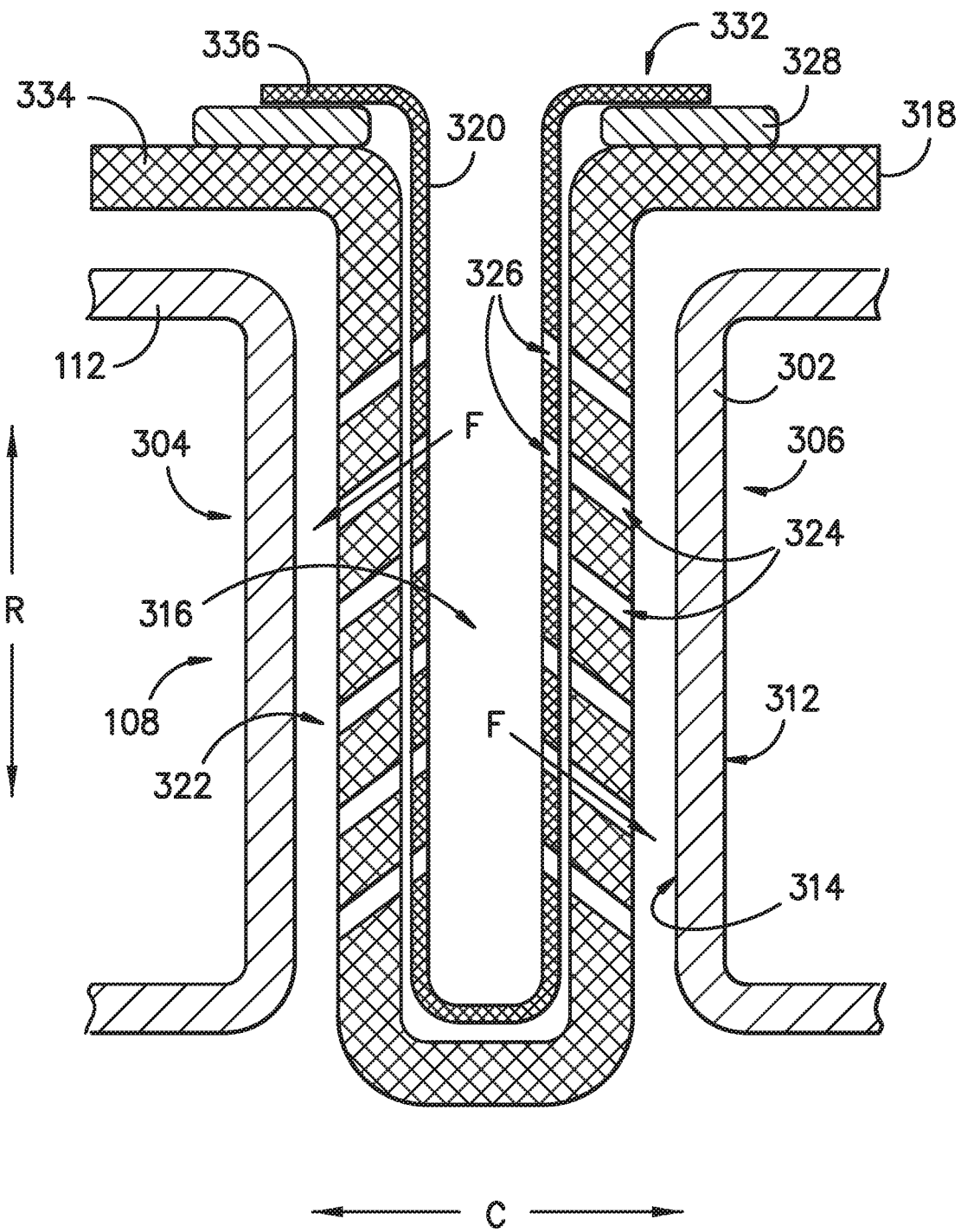
FIG. -6B-

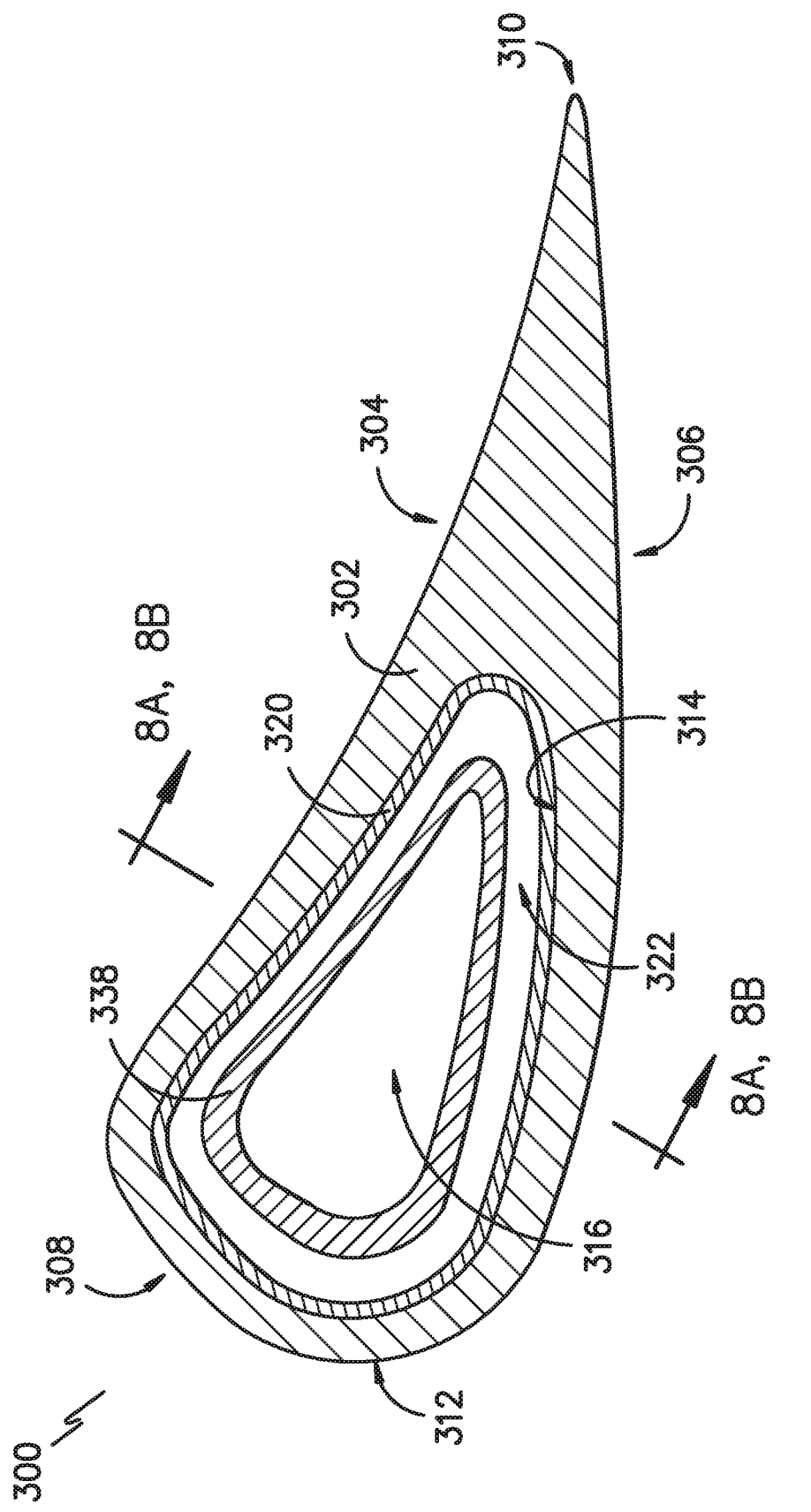

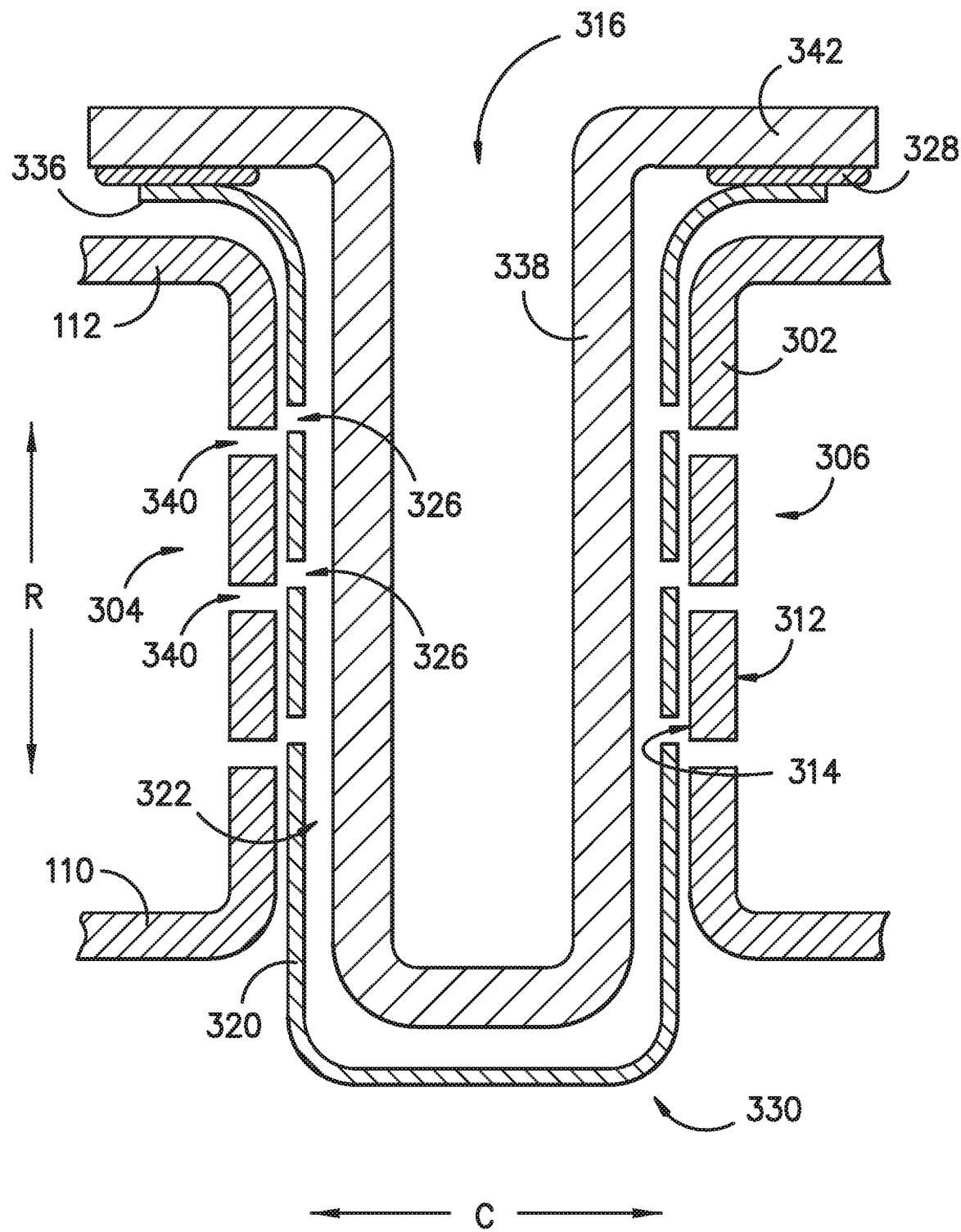
FIG. -8A-

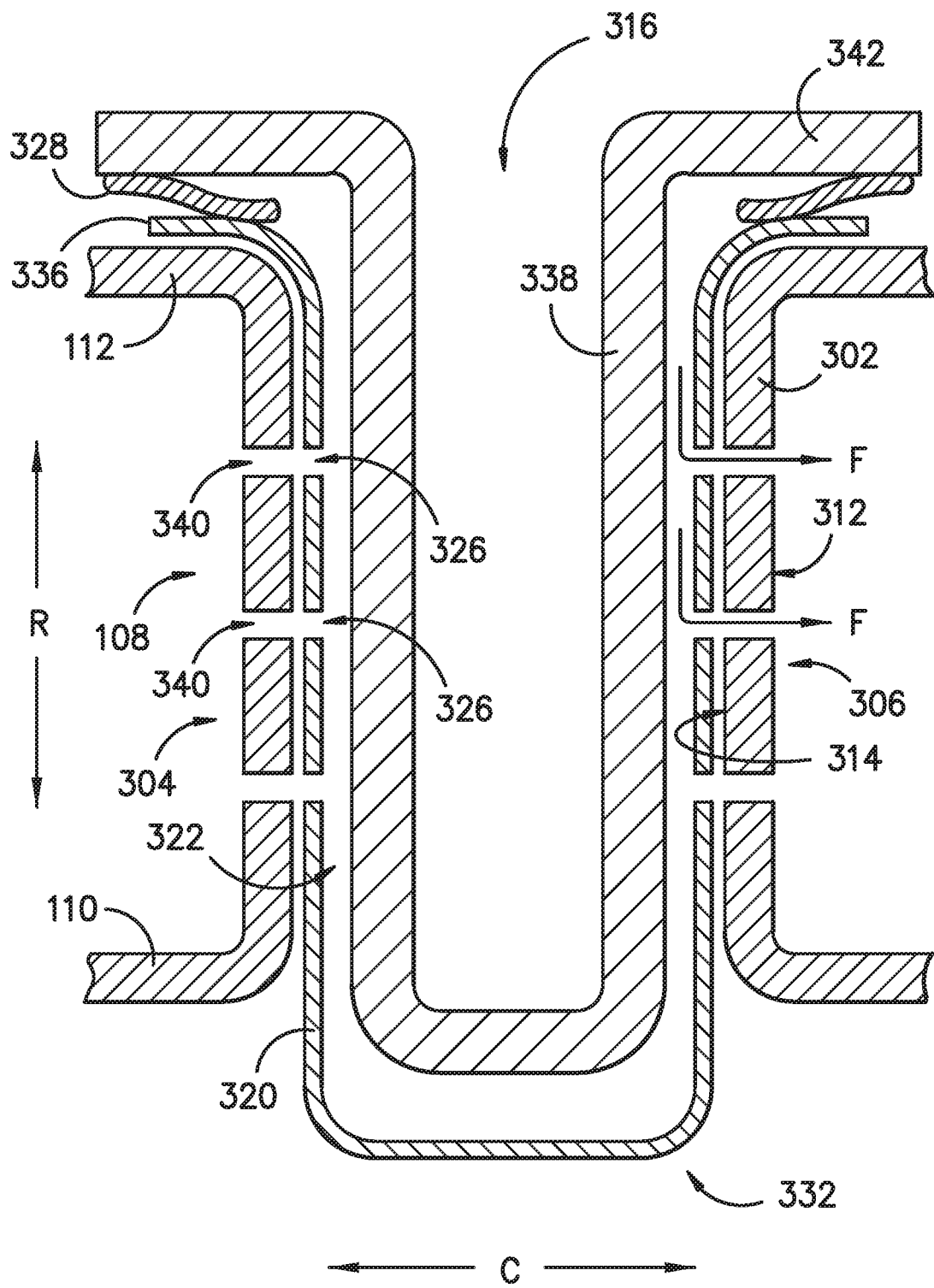
FIG. -8B-

MODULATED TURBINE COMPONENT COOLING

CROSS-REFERENCE TO RELATED APPLICATIONS

This application is a continuation of and claims priority to U.S. application Ser. No. 15/231,846, filed Aug. 9, 2016, the contents of which are incorporated herein in their entirety by reference thereto.

FIELD OF THE INVENTION

The present subject matter relates generally to gas turbine engines and particularly to features for cooling components of gas turbine engines. More particularly, the present subject matter relates to modulating a flow of cooling fluid through components of gas turbine engines.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The combustion gases have temperatures that can be detrimental to engine components, e.g., by causing material failures or the like. Typically, a flow of cooling fluid is provided to engine components exposed to the combustion gases to reduce or mitigate negative impacts of the combustion gas temperatures. However, the cooling flow may not be required or desirable during all operating conditions. For example, specific fuel consumption (SFC) may be reduced by reducing or restricting the flow of cooling fluid during non-high power cycle conditions, such as a cruise operating condition. Moreover, typical systems for providing cooling flow rely on a network of valves and pipes that can increase the engine weight, thereby increasing fuel consumption, without providing a benefit that sufficiently offsets the negative impacts of increased engine weight.

Therefore, improved cooling features that overcome one or more disadvantages of existing components and systems would be desirable. In particular, an insert for a turbine section component that modulates a flow of cooling fluid based on changes in temperature would be beneficial. More particularly, such an insert that shifts position when exposed to increased temperatures to allow an increase in cooling flow would be desirable. Further, such an insert that utilizes a difference in a coefficient of thermal expansion of the insert and the turbine section component to modulate the cooling flow would be advantageous. Additionally or alternatively, such an insert that utilizes a shape memory alloy to modulate the cooling flow would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an airfoil for a gas turbine engine is provided. The airfoil comprises a body having a pressure side and a suction side. The body defines a cavity for receipt of a flow of cooling fluid. The airfoil further includes a flow modulation insert positioned within the cavity. The flow modulation insert defines a plurality of apertures permitting the cooling fluid to flow therethrough. The airfoil also includes an attachment element that varies in position between a first position and a second position. The flow modulation insert is coupled to the attachment element such that a location of the plurality of apertures of the flow modulation insert is variable to modulate the flow of cooling fluid through the apertures of the flow modulation insert.

In another exemplary embodiment of the present disclosure, a shroud for a gas turbine engine is provided. The shroud comprises a cooling channel for a flow of cooling fluid. The cooling channel has an inlet defined in a forward end of the shroud and an outlet defined within the shroud adjacent an internal cooling passage of the shroud. The shroud also includes an insert that varies in position between a first position and a second position based on changes in an environmental temperature of the insert. The first position blocks the cooling channel to reduce the flow of cooling fluid therethrough, and the second position unblocks the cooling channel to increase the flow of cooling fluid therethrough.

In a further exemplary embodiment of the present disclosure, a method for operating a gas turbine engine is provided. The gas turbine engine includes a cooling circuit for providing a flow of cooling fluid to one or more components of the gas turbine engine. The method comprises increasing power provided to the gas turbine engine and decreasing power provided to the gas turbine engine, where increasing and decreasing the power provided to the gas turbine engine modulates a position of a flow modulation insert located in the cooling circuit to modulate the flow of cooling fluid through the cooling circuit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-sectional view of an exemplary gas turbine engine according to various embodiments of the present subject matter.

FIG. 2 provides a close-up, side view of a portion of a turbine section of the exemplary gas turbine engine of FIG. 1.

FIG. 3A provides a cross-section view of a shroud of the turbine section of FIG. 2 having an insert in a first position, according to an exemplary embodiment of the present subject matter.

FIG. 3B provides the cross-section view of the shroud of FIG. 3A having the insert in a second position, according to an exemplary embodiment of the present subject matter.

FIG. 3C provides a cross-section view of a shroud of the turbine section of FIG. 2 having an insert in a first position, according to an exemplary embodiment of the present subject matter.

FIG. 3D provides the cross-section view of the shroud of FIG. 3C having the insert in a second position, according to an exemplary embodiment of the present subject matter.

FIG. 4 provides a forward end view of a portion of the shroud of FIG. 2, according to an exemplary embodiment of the present subject matter.

FIG. 5 provides an axial cross-section view of an airfoil of a turbine nozzle, according to an exemplary embodiment of the present subject matter.

FIG. 6A provides a radial cross-section view of the airfoil of FIG. 5 with a flow modulation insert in a first position, according to an exemplary embodiment of the present subject matter.

FIG. 6B provides the cross-section view of the airfoil of FIG. 6A with the flow modulation insert in a second position, according to an exemplary embodiment of the present subject matter.

FIG. 7 provides an axial cross-section view of an airfoil of a turbine nozzle, according to an exemplary embodiment of the present subject matter.

FIG. 8A provides a radial cross-section view of the airfoil of FIG. 7 with a flow modulation insert in a first position, according to an exemplary embodiment of the present subject matter.

FIG. 8B provides the cross-section view of the airfoil of FIG. 8A with the flow modulation insert in a second position, according to an exemplary embodiment of the present subject matter.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. Fan blades 40 and disk 42 are together rotatable about the longitudinal axis 12 by LP shaft 36. In some embodiments, fan 38, including fan blades 40 and disk 42, may be rotatable across a power gear box that includes a plurality of gears for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78 such as components within the combustion section 26 or downstream thereof, may comprise a ceramic matrix composite (CMC) material, which is a non-metallic material having high temperature capability. In general, turbine performance and efficiency may be improved by increased combustion gas temperatures; therefore, non-traditional high temperature materials, such as CMC materials, are more commonly being used for various components within gas turbine engines, including components within the flow path of the combustion gases. Exemplary CMC materials utilized for gas turbine engine components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAIV-IIC®), alumina silicates (e.g., Nextel's 440 and 480), and chopped whiskers and fibers (e.g., Nextel's 440 and SAF-FIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As stated, components comprising a CMC material may be used within the hot gas path 78, such as within the combustion and/or turbine sections of engine 10. However, CMC components may be used in other sections as well, such as the compressor and/or fan sections. As a particular example described in greater detail below, a turbine nozzle or a turbine shroud may be formed from a CMC material to better withstand the heat of the combustion gases, as well as to withstand increased combustion gas temperatures.

It will be appreciated that, although described with respect to turbofan engine 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Referring now to FIG. 2, a schematic view is provided of the HP turbine 28 of the turbine section of core turbine engine 16, which is located downstream from combustion section 26. The combustion section 26 generally includes a combustor defining a combustion chamber 80; a mixture of fuel and air is combusted within the combustion chamber to generate a flow of combustion gases 66 therethrough. Downstream of the combustion section 26, the HP turbine 28 includes a first turbine nozzle stage 100, a turbine blade stage 102, and a second turbine nozzle stage 104, each configured to direct a flow of combustion gasses therethrough. Notably, the first turbine nozzle stage 100 is located immediately downstream from the combustion section 26, and thus may also be referred to as a combustor discharge nozzle stage. Further, it should be understood that, although only two nozzle stages and one blade stage are illustrated in FIG. 2, HP turbine 28 may include a plurality of nozzle and blade stages. Moreover, LP turbine 30 likewise may be configured with a plurality of turbine nozzle and turbine blade stages, and each stage of HP turbine 28 and LP turbine 30 may comprise a plurality of turbine components that define and/or are positioned within the hot gas path 78 through which the combustion gases flow.

The first turbine nozzle stage 100 includes a plurality of turbine nozzle sections 106 spaced along a circumferential direction C (FIG. 4). Each first turbine nozzle section 106 forming the first turbine nozzle stage 100 includes a first stage turbine nozzle 108 positioned within the hot gas path 78. Further, each nozzle section 106 includes an inner band segment 110 defining an inner wall of the nozzle section 106 and an outer band segment 112 defining an outer wall of the nozzle section 106, with nozzle 108 extending generally along the radial direction R from inner band segment 110 to outer band segment 112. Together, the plurality of first turbine nozzle sections 106 define the first turbine nozzle stage 100, with an inner band defined by the plurality of inner band segments 110 of nozzle sections 106, an outer band defined by the plurality of outer band segments 112 of nozzle sections 106, and a plurality of nozzles 108 extending from the inner band to the outer band. In some embodiments, the inner band and/or the outer band may be formed as a single continuous component rather than from a plurality of inner and outer band segments 110, 112. As such, in appropriate embodiments, first turbine nozzle stage 100 may be formed from an inner band and an outer band with a plurality of nozzles 108 extending therebetween, rather than from a plurality of nozzle segments comprising an inner band segment 110, an outer band segment 112, and one or more nozzles 108.

Located immediately downstream of the first turbine nozzle stage 100 and immediately upstream of the second turbine nozzle stage 104, the HP turbine 28 includes a first stage 102 of turbine rotor blades 116. First stage 102 of turbine rotor blades 116 includes a plurality of turbine rotor blades 116 spaced along the circumferential direction C and a first stage rotor 118. Each turbine rotor blade 116 is attached to the first stage rotor 118. Although not depicted, the first stage turbine rotor 118 is, in turn, connected to the HP shaft 34 (FIG. 1). In such manner, the turbine rotor blades 116 may extract kinetic energy from the flow of combustion gases through the hot gas path 78 defined by the HP turbine 28 as rotational energy applied to the HP shaft 34. Core gas turbine engine 16 additionally includes a shroud 120 exposed to and at least partially defining hot gas path 78. Shroud 120 is described in greater detail below.

Similar to the plurality of nozzle sections 106 forming the first turbine nozzle stages 100, a radially inner portion of each turbine rotor blade 116 includes a wall or platform 122. Additionally, each turbine rotor blade 116 includes a tip 124 at a radially outer portion of the blade. Shroud 120 may be positioned radially adjacent yet spaced apart from the blade tips 124 such that shroud 120 defines an outer wall of the rotor blade stage 102. Further, shroud 120 includes a radially outer surface 126 opposite a radially inner surface 128 that is exposed to and at least in part defines the hot gas path 78. As shown in FIG. 2, shroud 120 is tightly configured relative to the blades 116 so that the shroud 120 defines an outer radial flow path boundary for the hot combustion gas flowing through the turbine 16. Shroud 120 generally forms a ring or shroud around the first stage 102 of turbine rotor blades 116, i.e., shroud 120 extends circumferentially about the longitudinal engine axis 12 proximate the turbine rotor blade stage 102. As such, in the depicted exemplary embodiment, shroud 120 is an annular shroud that extends circumferentially around first stage 102 of turbine rotor blades 124. In some embodiments, shroud 120 may be formed as a continuous, unitary, or seamless ring. However, in other embodiments shroud 120 may be formed from a plurality of shroud segments that together form shroud 120. Thus, in such embodiments, shroud 120 may include a plurality of shroud segments positioned next to one another along the circumferential direction C to form generally annular shroud 120 around first turbine rotor blade stage 102.

As further depicted in FIG. 2, the second turbine nozzle stage 104 includes a plurality of second turbine nozzle sections 130 spaced along a circumferential direction C (FIG. 4). Each second turbine nozzle section 130 forming the second turbine nozzle stage 104 includes a plurality of second stage turbine nozzles 132 positioned within the hot gas path 78. Moreover, second turbine nozzle stage 104 includes a plurality of inner band segments 134 forming an inner wall of second turbine nozzle stage 104, as well as a plurality of outer band segments 136 forming an outer wall of second turbine nozzle stage 104. Each second stage turbine nozzle 132 extends generally along the radial direction R from an inner band segment 134 to an outer band segment 136. Similar to the first turbine nozzle stage 100, the plurality of second turbine nozzle sections 130 together define the second turbine nozzle stage 104, with an inner band defined by the plurality of inner band segments 134 of nozzle sections 130, an outer band defined by the plurality of outer band segments 136 of nozzle sections 130, and a plurality of nozzles 132 extending from the inner band to the outer band. In some embodiments, the inner band and/or the outer band may be formed as a single continuous component rather than from a plurality of inner and outer band segments 134, 136. As such, in appropriate embodiments, second turbine nozzle stage 104 may be formed from an inner band and an outer band with a plurality of nozzles 132 extending therebetween, rather than from a plurality of nozzle segments comprising an inner band segment 134, an outer band segment 136, and one or more nozzles 132.

Further, although described herein with respect to HP turbine 28, the present subject matter is not limited to HP turbines but may additionally or alternatively be utilized in a similar manner in the low pressure compressor 22, high pressure compressor 24, LP turbine 30, and/or any other suitable component of turbofan engine 10.

Referring to FIGS. 3A and 3B, cross-sectional views are provided of a portion of shroud 120 according to an exemplary embodiment of the present subject matter. As shown in FIG. 3A and FIG. 3B, shroud 120 defines a cooling channel 200 for directing a flow of cooling fluid therethrough. The flow of cooling fluid may be, e.g., a flow of pressurized air diverted from HP compressor 24. The cooling channel 200 has an inlet 202 defined in a forward end of shroud 120 and an outlet 204 defined within shroud 120 adjacent an internal cooling passage 206 of shroud 120. Thus, the cooling channel 200 provides fluid communication from the forward end of the shroud 120 to cooling passage 206. More specifically, the inlet 202 of cooling channel 200 has an inlet flow area over which cooling fluid flow is permitted to cooling channel 200. Similarly, the outlet 204 of cooling channel 200 has an outlet flow area over which cooling fluid flow is permitted to cooling passage 206.

As further shown in FIG. 3A, FIG. 3B, and FIG. 4, an insert 208 is positioned at the inlet 202 of cooling channel 200. Referring particularly to FIG. 4, insert 208 may substantially surround or be positioned over inlet 202 on a forward end 121 of shroud 120, but insert 208 may have other configurations as well. Insert 208 changes positions in response to temperature changes to modulate the flow of cooling fluid to cooling channel 200. More particularly, insert 208 has a first position 210, shown in FIG. 3A, that the insert maintains until a threshold temperature is reached. In the first position 210, insert 208 restricts or blocks the flow of cooling fluid to cooling channel 200, i.e., insert 208 in the first position reduces the inlet flow area of inlet 202. In some embodiments, the first position 210 of insert 208 may provide a reduction in inlet flow area of at least about 50%, generally within a range of about 50% to about 90%. In an exemplary embodiment, the first position 210 reduces the inlet flow area by about 80% to about 85%. In other embodiments, the first position 210 may block essentially all cooling fluid flow through inlet 202, i.e., the first position may provide an approximately 100% reduction in inlet flow area.

At the threshold temperature, the insert 208 transitions to a second position 212, shown in FIG. 3B. In the second position 212, insert 208 provides little to no restriction of cooling fluid flow through inlet 202 of cooling passage 200. That is, if the insert 208 transitions from the first position 210 to the second position 212, the insert 208 opens up the inlet 202 to permit a greater flow of cooling fluid through inlet 202 than was permitted when the insert 208 was in the first position 210. In some embodiments, the second position 212 of insert 208 may block only about 5% to about 20% of the inlet flow area. In an exemplary embodiment, the second position 212 reduces the inlet flow area by about 10% or less. In other embodiments, the second position 212 may essentially provide no restriction of cooling fluid flow through inlet 202, i.e., the second position may permit flow over approximately 100% of the inlet flow area.

As shown in FIGS. 3C and 3D, in other embodiments insert 208 may additionally or alternatively be positioned at outlet 204 of cooling channel 200 to modulate the flow of cooling fluid by variously restricting or not restricting the outlet flow area. Referring to FIG. 3C, in the first position 210, insert 208 restricts the outlet flow area of outlet 204, thereby restricting the cooling fluid flow to cooling passage 206. As depicted in FIG. 3D, in the second position 212, insert 208 unblocks or does not restrict the outlet flow area of outlet 204 such that a greater flow of cooling fluid may be provided to cooling passage 206. Similar the modulation of the inlet flow area, the first position 210 of insert 208 may restrict the outlet flow area by at least about 50%, generally within a range of about 50% to about 90%. In one embodiment, the first position 210 reduces the outlet flow area by about 80% to about 85%. In other embodiments, the first position 210 may block essentially all cooling fluid flow through outlet 204, i.e., the first position may provide an approximately 100% reduction in outlet flow area. Further, with respect to the second position 212, insert 208 may block only about 5% to about 20% of the outlet flow area. In an exemplary embodiment, the second position 212 reduces the outlet flow area by about 10% or less. In other embodiments, the second position 212 may essentially provide no restriction of cooling fluid flow through outlet 204, i.e., the second position may permit flow over approximately 100% of the outlet flow area.

It will be appreciated that in either the embodiment of FIGS. 3A and 3B or the embodiment of FIGS. 3C and 3D, insert 208 may transition between first position 210 and second position 212 based on changes in temperature. For example, insert 208 may be in the first position 210 until the temperature of its surrounding environment rises above a threshold temperature; then, insert 208 transitions to the second position 212 in response to the change in temperature to a temperature greater than the threshold temperature. However, if the temperature of the environment of insert 208 cools to below the threshold temperature, insert 208 returns to the first position 210. That is, insert 208 changes from its first position 210 to its second position 212 or vice versa as the temperature of its environment rises above or falls below the threshold temperature.

Insert 208 may be made from a material with a relatively large coefficient of thermal expansion, i.e., a relatively high alpha material, or a shape memory alloy such that the insert 208 can expand and contract in response to temperature changes. More particularly, in some embodiments, insert 208 and shroud 120 may be formed from materials having different coefficients of thermal expansion, such that the material of each component has different thermal growth characteristics. For example, insert 208 may be formed from a metal material and shroud 120 from a CMC material; in such embodiments, insert 208 is a high alpha material in comparison to the shroud 120. As such, the insert 208 expands or grows to a greater extent than the shroud 120 at a given temperature, i.e., the insert 208 expands or grows more than the shroud 120 as the surrounding temperature begins to increase. The high alpha material of insert 208 may be selected such that insert 208 expands to the second position 212 above a certain temperature.

In other embodiments, insert 208 may be formed from a shape memory alloy. A shape memory alloy can exist in two distinct temperature dependent crystal structures or phases. The temperature at which a phase change occurs between the crystal structures is dependent upon the composition of the alloy, and the phase change temperature is known as the transition temperature. For example, one distinct crystal structure, known as martensite, corresponds to a lower temperature and a second distinct crystal structure, known as austenite, corresponds to a higher temperature. A two-way shape memory alloy has the ability to recover a preset shape upon heating above the transition temperature and to return to a certain alternate shape upon cooling below the transition temperature. The two-way shape memory alloy may be programmed or trained through a process of mechanical working and heat treatment so that it responds to temperature changes and/or the transition temperature in a predictable and repeatable manner. Thus, in some embodiments, insert 208 may be formed from a shape memory alloy such that insert 208 assumes the first position 210 below a threshold or transition temperature and assumes the second position 212 above the threshold or transition temperature. In alternate embodiments, the insert 208 may comprise a bi-metallic material that responds to the threshold temperature in a similar manner to a shape memory alloy. In still other embodiments, the insert 208 may comprise a high temperature shape memory polymer that responds to the threshold temperature in a similar manner to a shape memory alloy. In particular embodiments, the insert 208 is constructed of a two-way shape memory alloy such as nickel titanium (NiTi) alloy having a phase change or transition temperature within a heat transient of the cooling fluid flowing, e.g., between the compressor section 24 and the cooling passages of the turbine section. In such embodiments, at least a portion of the insert 208 is subjected to a programming process in which the insert 208 assumes the first position 210 in a martensite or lower temperature configuration and assumes the second position 212 in an austenite or higher temperature configuration.

Turning now to FIG. 5, an axial cross-section view is provided of an airfoil of a turbine nozzle, such as first stage turbine nozzle 108 or second stage turbine nozzle 132, according to an exemplary embodiment of the present subject matter. Each turbine nozzle includes an airfoil 300 that extends within the hot gas path 78 such that the combustion gases 66 flow against and around the airfoil. Each airfoil 300 has a body 302 that includes a concave pressure side 304 opposite a convex suction side 306. Opposite pressure and suction sides 304, 306 of each airfoil 300 extend axially between a leading edge 308 and an opposite trailing edge 310. Leading edge 308 defines a forward end of airfoil 300, and trailing edge 310 defines an aft end of airfoil 300. Further, pressure and suction sides 304, 306 of airfoil 300 define an outer surface 312 of the airfoil body 302. Additionally, an inner surface 314 of body 302 defines a cavity 316, which in the depicted embodiment is closer to leading edge 308 than trailing edge 310 and mostly forward of an axial midpoint of the airfoil, for receiving a flow of cooling fluid, e.g., a flow of pressurized air diverted from HP compressor 24. The flow of cooling fluid may be directed to one or more portions of airfoil 300, e.g., to cool the airfoil and thereby mitigate the impacts of the temperatures of the combustion gases that flow against and around the airfoil 300.

As further depicted in FIG. 5, a flow director 318 is positioned in the cavity 316, and a flow modulation insert 320 is positioned adjacent the flow director 318. In the embodiment of FIG. 5, the flow modulation insert 320 is positioned inward of the flow director 318 such that a space 322 is defined between inner surface 314 of body 302 and the flow director 318. In other embodiments, the flow modulation insert 320 may be positioned outward of flow director 318 such that the space 322 is defined between inner surface 314 and flow modulation insert 320.

Referring to FIGS. 6A and 6B, radial cross-section views are provided of the airfoil 300 of FIG. 5, according to an exemplary embodiment of the present subject matter. As shown in FIGS. 6A and 6B, the flow director 318 defines a plurality of apertures 324 therethrough, e.g., for directing the flow of cooling fluid received in cavity 316 to the inner surface 314 of airfoil body 302. Each aperture 324 has an aperture flow area over which cooling fluid flow may flow toward inner surface 314 of body 302. The flow modulation insert 320 also defines a plurality of apertures 326 therethrough, which may allow the flow of cooling fluid F to flow through flow modulation insert 320.

Similar to insert 208 described above, flow modulation insert 320 changes positions in response to temperature changes to modulate the flow of cooling fluid to body 302. More specifically, flow modulation insert 320 has a first position 330, shown in FIG. 6A, that the insert maintains until its environment reaches a threshold temperature. In the first position 330, flow modulation insert 320 restricts or blocks the flow of cooling fluid to apertures 324, i.e., flow modulation insert 320 in the first position reduces the aperture flow area of each aperture 324. In some embodiments, the first position 330 of flow modulation insert 320 may provide a reduction in aperture flow area of about 50% to about 90%. In an exemplary embodiment, the first position 330 reduces the aperture flow area by about 80% to about 85%. In other embodiments, the first position 330 may block essentially all cooling fluid flow through apertures 324, i.e., the first position may provide an approximately 100% reduction in aperture flow area.

At the threshold temperature, the flow modulation insert 320 transitions to a second position 332, shown in FIG. 6B. In the second position 332, flow modulation insert 320 provides little to no restriction of cooling fluid flow through apertures 324 of flow director 318. That is, if the flow modulation insert 320 transitions from the first position 330 to the second position 332, the flow modulation insert 320 opens up the apertures 324 to permit a greater flow of cooling fluid F through apertures 324 than was permitted when the flow modulation insert 320 was in the first position 330. In some embodiments, the second position 332 of flow modulation insert 320 may block only about 5% to about 20% of the aperture flow area. In an exemplary embodiment, the second position 332 reduces the aperture flow area by about 10% or less. In other embodiments, the second position 332 may essentially provide no restriction of cooling fluid flow through apertures 324 of flow director 318, i.e., the second position may permit flow over approximately 100% of the flow area of apertures 324. Accordingly, the flow modulation insert 320 may shift positions such that the location of its apertures 326 varies with respect to the apertures 324 of flow director 318 to modulate the flow of cooling fluid to airfoil body 302.

Similar to insert 208 previously described, in some embodiments flow modulation insert 320 may be made from a material with a large coefficient of thermal expansion, i.e., a high alpha material, or a shape memory alloy such that the flow modulation insert 320 can expand and contract in response to temperature changes. In an example embodiment in which the flow modulation insert 320 is formed from a high alpha material, the insert 320 may be formed from a metal material and the flow director 318 from a CMC material such that the insert 320 expands or grows to a greater degree than the flow director 318 as the temperature rises. For example, as the temperature increases, the apertures 326 of flow modulation insert 320 may expand in cross-sectional area more than apertures 324 of flow director 318 such that the flow modulation insert 320 no longer blocks apertures 324 or restricts flow through apertures 324 to a lesser extent than the insert 320 restricts the flow at lower temperatures. In other embodiments, flow modulation insert 320 may be formed from a shape memory alloy such that the insert 320 shifts position with respect to flow director 318 at an increased temperature to permit greater fluid flow through apertures 324 of flow director 318 and thereby provide greater cooling to airfoil body 302.

In still other embodiments, rather than forming flow modulation insert 320 from a high alpha material or a shape memory alloy, the airfoil 300 may include an attachment element 328 coupled to the flow modulation insert 320 that changes position in response to changes in temperature and thereby shifts the position of insert 320 in response to changes in temperature. As shown in FIG. 6A, the attachment element 328 takes on a first configuration to place the flow modulation insert 320 in the first position 330. More particularly, in the illustrated embodiment, the attachment element 328 is located between a flange 334 of the flow director 318 and a flange 336 of the flow modulation insert 320. To place the flow modulation insert 320 in its first position 330, where the flow modulation insert 320 substantially blocks or restricts cooling fluid flow through apertures 324 of flow director 318, at least a portion of the attachment element 328 is raised along the radial direction R from flange 334 of flow director 318. As such, the flow modulation insert 320 is raised along the radial direction R, which shifts the apertures of 326 of insert 320 out of alignment with apertures 324 of flow director 318 and thereby restricts the flow of cooling fluid F through apertures 324. To place the flow modulation insert 320 in its second position 332, where the flow modulation insert 320 permits a greater fluid flow through apertures 324 than in the first position, the raised portion of attachment element 328 lowers along the radial direction R, e.g., to rest against flange 334 of flow director 318, such that the apertures 326 of insert 320 substantially are aligned with the apertures 324 of flow director 318. At the least, the apertures 326 of flow modulation insert 320 in its second position 332 are more in line with the apertures 324 of flow director 318 such that the flow modulation insert 320 does not restrict the aperture flow area to the extent the flow area is restricted when insert 320 is in its first position 330.

Turning now to FIG. 7, an axial cross-section view is provided of airfoil 300, according to another exemplary embodiment of the present subject matter. In the depicted embodiment, a cavity insert 338 is positioned within cavity 316, and the flow modulation insert 320 is positioned adjacent the inner surface 314 of body 302 of airfoil 300. Thus, space 322 is defined between the flow modulation insert 320 and cavity insert 338.

Referring to FIGS. 8A and 8B, radial cross-section views are provided of the airfoil 300 of FIG. 7, according to an exemplary embodiment of the present subject matter. As shown in FIGS. 8A and 8B, the body 302 of airfoil 300 defines a plurality of apertures 340 therethrough, e.g., for directing the flow of cooling fluid received in cavity 316 to the outer surface 312 of body 302 to provide film cooling of the outer surface. Each aperture 340 has an aperture flow area over which cooling fluid flow may flow toward outer surface 312 of body 302. The flow modulation insert 320 defines the plurality of apertures 326 therethrough, which may allow the flow of cooling fluid F to flow through flow modulation insert 320.

As described with respect to the embodiment of FIGS. 6A and 6B, in the embodiment shown in FIGS. 8A and 8B, flow modulation insert 320 changes positions in response to temperature changes to modulate the flow of cooling fluid to body 302. More specifically, FIG. 8A illustrates the first position 330 of flow modulation insert 320, which the insert maintains until a threshold temperature is reached. In the first position 330, flow modulation insert 320 restricts or blocks the flow of cooling fluid to apertures 340 of body 302, i.e., flow modulation insert 320 in the first position reduces the aperture flow area of each aperture 340. In some embodiments, the first position 330 of flow modulation insert 320 may provide a reduction in aperture flow area of about 50% to about 90%. In an exemplary embodiment, the first position 330 reduces the aperture flow area by about 80% to about 85%. In other embodiments, the first position 330 may block essentially all cooling fluid flow through apertures 340, i.e., the first position may provide an approximately 100% reduction in aperture flow area.

At the threshold temperature, the flow modulation insert 320 transitions to a second position 332, shown in FIG. 8B. In the second position 332, flow modulation insert 320 provides little to no restriction of cooling fluid flow through apertures 340 of airfoil body 302. That is, if the flow modulation insert 320 transitions from the first position 330 to the second position 332, the flow modulation insert 320 opens up the apertures 340 to permit a greater flow of cooling fluid F through apertures 340 than was permitted when the flow modulation insert 320 was in the first position 330. In some embodiments, the second position 332 of flow modulation insert 320 may block only about 5% to about 20% of the aperture flow area. In an exemplary embodiment, the second position 332 reduces the aperture flow area by about 10% or less. In other embodiments, the second position 332 may essentially provide no restriction of cooling fluid flow through apertures 340 of body 302, i.e., the second position may permit flow over approximately 100% of the flow area of apertures 340. Accordingly, the flow modulation insert 320 may shift positions such that the location of its apertures 326 varies with respect to the apertures 340 of body 302 to modulate the flow of cooling fluid to body 302.

As previously described, in some embodiments flow modulation insert 320 may be made from a material with a large coefficient of thermal expansion, i.e., a high alpha material, or a shape memory alloy such that the flow modulation insert 320 can expand and contract in response to temperature changes. In an example embodiment in which the flow modulation insert 320 is formed from a high alpha material, the insert 320 may be formed from a metal material and the airfoil body 302 from a CMC material such that the insert 320 expands or grows to a greater degree than the body 302 as the temperature rises. For example, as the temperature increases, the apertures 326 of flow modulation insert 320 may expand in cross-sectional area more than apertures 340 of body 302 such that the flow modulation insert 320 no longer blocks apertures 340 or restricts flow through apertures 340 to a lesser extent than the insert 320 restricts the flow at lower temperatures. In other embodiments, flow modulation insert 320 may be formed from a shape memory alloy such that the insert 320 shifts position with respect to body 302 at an increased temperature to permit greater fluid flow through apertures 340 of body 302 and thereby provide greater cooling to the outer surface 312 of the body 302.

Alternatively, similar to the embodiment of FIGS. 6A and 6B, rather than forming flow modulation insert 320 from a high alpha material or a shape memory alloy, the airfoil 300 may include an attachment element 328 coupled to the flow modulation insert 320 that changes position in response to changes in temperature and thereby shifts the position of insert 320 in response to changes in temperature. As shown in FIG. 8A, the attachment element 328 takes on a first configuration to place the flow modulation insert 320 in the first position 330. More particularly, in the illustrated embodiment, the attachment element 328 is located between a flange 342 of the cavity insert 338 and the flange 336 of the flow modulation insert 320. To place the flow modulation insert 320 in its first position 330, where the flow modulation insert 320 substantially blocks or restricts cooling fluid flow through apertures 340 of body 302, at least a portion of the attachment element 328 is raised along the radial direction R, e.g., to rest against flange 342 of cavity insert 338. As such, the flow modulation insert 320 is raised along the radial direction R, which shifts the apertures of 326 of insert 320 out of alignment with apertures 340 of body 302 and thereby restricts the flow of cooling fluid F through apertures 340. To place the flow modulation insert 320 in its second position 332, where the flow modulation insert 320 permits a greater fluid flow through apertures 340 than in the first position, the raised portion of attachment element 328 lowers along the radial direction R such that the apertures 326 of insert 320 substantially are aligned with the apertures 340 of body 302. At the least, the apertures 326 of flow modulation insert 320 in its second position 332 are more in line with the apertures 340 of body 302 such that the flow modulation insert 320 does not restrict the aperture flow area of apertures 340 to the extent the flow area is restricted when insert 320 is in its first position 330.

As previously stated, it will be appreciated that in embodiments such as those illustrated in FIGS. 6A and 6B and FIGS. 8A and 8B that utilize the attachment element 328, the attachment element 328 rather than the flow modulation insert 320 may be formed from a high alpha material or a shape memory alloy. As such, the use of the high alpha material or shape memory alloy may be limited to the attachment element 328, which may be more economical or otherwise more efficient or beneficial than forming the flow modulation insert 320 from such materials.

Accordingly, as described herein, a gas turbine engine may be provided with one or more features for modulating a flow of cooling fluid therethrough, e.g., to provide different cooling flows for different operating conditions or to provide a flow of cooling fluid during some but not all operating conditions. As an example, the first position of inserts 208, 320 may be a "cold" position, where the insert 208 or 320 blocks a flow of cooling fluid when an operating temperature of a gas turbine engine is below a certain temperature. Further, the second position of inserts 208, 320 may be a "hot" position, wherein the insert 208 or 320 unblocks the flow of cooling fluid when the operating temperature is at or above the certain temperature. In some embodiments, inserts 208, 320 may move between the first position and the second position based on changes in pressure rather than changes in temperature, e.g., the inserts 208, 320 may be in the first position at lower pressures and in the second position at higher pressures. As another example, insert 208 and/or flow modulation insert 320 may comprise a shape memory alloy and have a martensite configuration and an austenite configuration. The martensite configuration of insert 208 or insert 320 may correspond to a first position, and the austenite configuration may correspond to a second position, where the first position blocks a flow of cooling fluid and the second position unblocks the flow of cooling fluid. In alternative embodiments, inserts 208, 320 may be made from a temperature based shape memory alloy or from a pressure based shape memory alloy. Of course, other configurations of insert 208 and/or flow modulation insert 320 may be used as well.

Further, in various embodiments, a gas turbine engine includes a cooling circuit where a flow of cooling fluid directed through the cooling circuit is modulated by throttling the power provided to the engine. For example, when the engine is throttled back, i.e., power to the engine is decreased, the temperature of the cooling fluid decreases and, thus, causes a flow modulation insert with a relatively higher coefficient of thermal expansion positioned in the cooling circuit to be exposed to a cooler or lower temperature of cooling fluid. As such, the modulation insert deflects toward a closed position to restrict the flow of cooling fluid through the cooling circuit. Conversely, when the engine is throttled up, i.e., power to the engine is increased, the temperature of the cooling fluid increases, thereby causing the modulation insert to be exposed to a hotter or higher temperature of cooling fluid. Accordingly, the modulation insert deflects toward an open position to allow a greater or more cooling fluid flow through the cooling circuit. It will be appreciated that the closed position may correspond to the first position and the open position may correspond to the second position, as described above.

In some embodiments, modulating the flow of cooling fluid based on throttling changes of the engine may be temperature based or, in other embodiments, may be pressure based. That is, throttling changes of the engine may modulate the cooling flow based on a thermal change in the cooling fluid or based on a pressure change of the cooling fluid. As such, throttling changes of the engine may be linked to cooling circuit modulation by a thermal mechanism or a pressure mechanism. Thus, as another example, as the engine is throttled back the pressure of the cooling fluid is reduced and the change in pressure causes the modulation insert to deflect to the closed position, or as the engine is throttled up, the pressure of the cooling fluid increases and the modulation insert moves to the open position. To modulate the insert position based on pressure changes, the modulation insert either may be mechanically linked, e.g., to a pressure sensitive fulcrum or the like, or may be made from or coupled to an attachment element made from a pressure sensitive shape memory alloy.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A cooling circuit for a gas turbine engine, comprising:
a cooling channel for a flow of cooling fluid, the cooling channel defined between a radially outer surface and a radially inner surface, the radially outer surface opposite the radially inner surface, the radially inner surface exposed to a hot gas path of the gas turbine engine, the cooling channel having an inlet and an outlet defined adjacent a cooling passage; and
an insert that varies in position between a first position and a second position based on changes in an environmental temperature of the insert,
wherein the first position blocks the cooling channel to reduce the flow of cooling fluid therethrough,
wherein the second position unblocks the cooling channel to increase the flow of cooling fluid therethrough,
wherein the insert is positioned over the inlet in both the first position and the second position such that at least a first portion of the insert and a second portion of the insert opposite the first portion remain in a same location in both the first position and the second position, and
wherein the first portion of the insert is disposed on one side of the inlet of the cooling channel and the second portion of the insert is disposed on an opposite side of the inlet of the cooling channel.

2. The cooling circuit of claim 1, wherein the inlet has an inlet flow area, and wherein the first position of the insert reduces the inlet flow area by at least 50%.

3. The cooling circuit of claim 2, wherein the first position of the insert reduces the inlet flow area by at least 80%.

4. The cooling circuit of claim 1, wherein the cooling channel is defined in a shroud, wherein the radially inner surface is positioned radially adjacent a plurality of turbine rotor blades, and wherein the inlet of the cooling channel is defined in a forward end of the shroud.

5. The cooling circuit of claim 4, wherein the insert is made from a material that has a larger coefficient of thermal expansion than a material from which the shroud is made such that the insert expands to a greater extent than the shroud at a given temperature.

6. The cooling circuit of claim 1, wherein the insert is made from a shape memory alloy.

7. The cooling circuit of claim 6, wherein the shape memory alloy is a two-way shape memory alloy.

8. A shroud assembly for a gas turbine engine, comprising:
a shroud having a radially outer surface opposite a radially inner surface, the radially inner surface exposed to a hot gas path of the gas turbine engine and positioned radially adjacent a plurality of turbine rotor blades;
a cooling channel for a flow of cooling fluid defined in the shroud, the cooling channel having an inlet defined in a forward end of the shroud and an outlet defined within the shroud adjacent an internal cooling passage of the shroud, the forward end defined upstream of the internal cooling passage relative to the hot gas path of the gas turbine engine; and
an insert that varies in position between a first position and a second position based on changes in an environmental temperature or pressure of the shroud assembly,
wherein the first position blocks the cooling channel to reduce the flow of cooling fluid therethrough,
wherein the second position unblocks the cooling channel to increase the flow of cooling fluid therethrough,
wherein the insert surrounds the inlet in both the first position and the second position,
wherein the insert includes a first portion and a second portion of the insert opposite the first portion, wherein at least the first portion and the second portion of the insert remain in a same location in both the first position and the second position, and
wherein the first portion of the insert is disposed on one side of the inlet of the cooling channel and the second portion of the insert is disposed on an opposite side of the inlet of the cooling channel.

* * * * *